United States Patent
Saitou et al.

(10) Patent No.: US 9,914,650 B2
(45) Date of Patent: Mar. 13, 2018

(54) WATER TREATMENT UNIT

(71) Applicant: DAIKIN INDUSTRIES, LTD., Osaka-shi, Osaka (JP)

(72) Inventors: Tomoki Saitou, Osaka (JP); Masaya Nishimura, Osaka (JP); Tsunahiro Ohdou, Osaka (JP); Sachiko Yamaguchi, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 15/126,691

(22) PCT Filed: Mar. 19, 2015

(86) PCT No.: PCT/JP2015/001539
§ 371 (c)(1),
(2) Date: Sep. 16, 2016

(87) PCT Pub. No.: WO2015/146091
PCT Pub. Date: Oct. 1, 2015

(65) Prior Publication Data
US 2017/0088444 A1  Mar. 30, 2017

(30) Foreign Application Priority Data
Mar. 28, 2014 (JP) ................................ 2014-068468

(51) Int. Cl.
*C02F 1/42* (2006.01)
*C02F 1/46* (2006.01)
*C02F 103/32* (2006.01)

(52) U.S. Cl.
CPC ........ *C02F 1/4608* (2013.01); *C02F 2103/32* (2013.01); *C02F 2303/04* (2013.01); *C02F 2305/023* (2013.01)

(58) Field of Classification Search
CPC .......... C02F 1/4672; C02F 2201/46105; C02F 2303/04; C02F 2103/02; C02F 1/467;
(Continued)

(56) References Cited

U.S. PATENT DOCUMENTS 7,186,323 B2 * 3/2007 Hara ..................... C02F 1/4618
204/228.1
8,354,030 B1  1/2013 Schuh
(Continued)

FOREIGN PATENT DOCUMENTS

EP  2 072 471 A1  6/2009
EP  2 431 335 A1  3/2012
(Continued)

*Primary Examiner* — Walter D. Griffin
*Assistant Examiner* — Cameron J Allen
(74) *Attorney, Agent, or Firm* — Birch, Stewart, Kolasch & Birch, LLP

(57) ABSTRACT

A water treatment unit performs a normal operation during which discharge parts generate an electric discharge in a state where water flows into a treatment vessel and treated water flows out of the treatment vessel. When the water treatment unit starts operating, the water treatment unit performs a preparatory operation for a predetermined period of time before starting the normal operation. During the preparatory operation, the discharge parts generate an electric discharge in a state where an outflow of the water from the treatment vessel is stopped. As a result, the water which has been stagnating in the treatment vessel while the water treatment unit is not operating and in which bacteria have grown is sufficiently sterilized.

3 Claims, 4 Drawing Sheets

(58) Field of Classification Search
CPC .......... C02F 1/4618; C02F 9/005; C02F 1/42; C02F 2209/005; C02F 2201/46125; C02F 2201/46145; C02F 2201/4617; B01F 3/0424; B01F 2003/04943; B01F 2215/0052; B01F 2003/04886; B01F 3/04
See application file for complete search history.

(56) References Cited

U.S. PATENT DOCUMENTS

2013/0048491 A1    2/2013   Hung
2014/0353223 A1   12/2014   Nishimura et al.

FOREIGN PATENT DOCUMENTS

| JP | 50-151770 A | 12/1975 |
|---|---|---|
| JP | 58-64182 A | 4/1983 |
| JP | 2011-251275 A | 12/2011 |
| JP | 2013-43177 A | 3/2013 |
| JP | 2013-150975 A | 8/2013 |

* cited by examiner

WATER TREATMENT UNIT

TECHNICAL FIELD

The present invention relates to a water treatment unit, and more particularly relates to a water treatment unit with the ability to sterilize water by eliminating bacteria even when the bacteria grow inside the water treatment unit.

BACKGROUND ART

Water treatment units for sterilizing water have been known in the art. For example, Patent Document 1 discloses a water treatment unit including a treatment vessel storing water, an inflow channel allowing the water to flow into the treatment vessel, an outflow channel allowing the water to flow out of the treatment vessel, and a pair of electrodes provided inside the treatment vessel. When the water treatment unit is operating, the water flows through the treatment vessel from the inflow channel toward the outflow channel. In the meantime, a predetermined voltage is applied to the pair of electrodes in the water to generate an electric discharge. This produces bactericidal factors in the water. With the thus produced bactericidal factors, the water flowing through the treatment vessel is sterilized, or more specifically, bactericidal water (which means herein water containing the bactericidal factors, the same hereinafter) is produced in the treatment vessel.

CITATION LIST

Patent Document

PATENT DOCUMENT 1: Japanese Unexamined Patent Publication No. 2013-150975

SUMMARY OF INVENTION

Technical Problem

However, when the above-described water treatment unit is not operating, the water stagnates inside the treatment vessel, and bacteria may grow in the water. Therefore, if the water is pumped out of the treatment vessel immediately after the water treatment unit starts operating, the water containing a large quantity of the bacteria may flow out of the treatment vessel without being sufficiently sterilized. This is in particular undesirable in an application in which the water treated in the treatment vessel is to be supplied to, and used in, an external facility.

In view of the foregoing background, it is therefore an object of the present invention to sufficiently sterilize the water which stagnates in the treatment vessel and in which bacteria grow while the water treatment unit is not operating.

Solution to the Problem

A first aspect of the invention provides a water treatment unit (10) including a treatment vessel (11) configured to store water, and discharge parts (31-34) configured to generate an electric discharge to produce bactericidal factors in the water in the treatment vessel (11). The water treatment unit (10) performs a normal operation, during which the discharge parts (31-34) generate an electric discharge in a state where the water flows into the treatment vessel (11) and treated water flows out of the treatment vessel (11).

In the first aspect, when the water treatment unit (10) starts operating, the water treatment unit (10) performs a preparatory operation for a predetermined period of time before starting the normal operation. During the preparatory operation, the discharge parts (31-34) generate an electric discharge in a state where an outflow of the water from the treatment vessel (11) is stopped.

According to the first aspect of the invention, when the water treatment unit (10) starts operating, first, a preparatory operation is performed for a predetermined period of time. During the preparatory operation, bactericidal factors are produced by the discharge parts (31-34) in the water in the treatment vessel (11), and thus the water in the treatment vessel (11) is sterilized by the bactericidal factors. Thus, even if the water stagnates in the treatment vessel (11) and bacteria have grown in the water while the water treatment unit (10) is not operating, the water will still be sterilized when the water treatment unit (10) starts operating. Furthermore, during the preparatory operation, there is no risk of the water with bacterial growth being supplied to an external facility without having been sufficiently sterilized, since the water does not flow out of the treatment vessel (11).

A second aspect of the invention is an embodiment of the first aspect of the invention. In the second aspect, an inflow of the water into the treatment vessel (11) is stopped while the preparatory operation is being performed.

According to the second aspect of the invention, during the preparatory operation, the inflow of the water into the treatment vessel (11) is stopped. That is, while the preparatory operation is being performed, the water containing bacteria does not flow into the treatment vessel (11), and all bactericidal factors produced by the electric discharge act on the bacteria in the water which has been stagnating in the treatment vessel (11) while the water treatment unit (10) is not operating. Therefore, the water in the treatment vessel (11) may be more reliably sterilized before the start of the normal operation.

A third aspect of the invention is an embodiment of the first or the second aspect of the invention. In the third aspect, the water treatment unit further includes an auxiliary water vessel (50) into which the treated water flows from the treatment vessel (11). The water treatment unit supplies the water from the auxiliary water vessel (50) to an external facility.

According to the third aspect of the invention, the water treated in the treatment vessel (11) flows into the auxiliary water vessel (50), and then is supplied to the external facility. During the preparatory operation, no inflow of water into the treatment vessel (11) occurs since the outflow of the water out of the treatment vessel (11) is stopped. Therefore, the bactericidal factors produced during the preparatory operation may fail to pervade the entire water in the treatment vessel (11), and, when the normal operation starts, the water may flow out of the treatment vessel (11) without having been sufficiently sterilized.

In the present aspect, however, since the water flowing out of the treatment vessel (11) is allowed to temporarily flow into the auxiliary water vessel (50), a movement of the water caused by the inflow makes the bactericidal factors pervade the entire water in the auxiliary water vessel (50) and sterilize the water entirely. This may prevent insufficiently sterilized water from being supplied from the auxiliary water vessel (50) to the external facility.

Advantages of the Invention

According to the first aspect of the invention, when the water treatment unit (10) starts operating, the preparatory operation is performed for a predetermined period of time, and thus, even when bacteria have grown in the water which has been stagnating in the treatment vessel (11) while the water treatment unit (10) is not operating, the bactericidal factors produced by the electric discharge act on the bacteria. Thus, the water in the treatment vessel (11) may be sufficiently sterilized before the start of the normal operation, and the sufficiently sterilized water may be supplied to the external facility.

According to the second aspect of the invention, while the preparatory operation is being performed, the water containing bacteria does not flow into the treatment vessel (11). Thus, all of the bactericidal factors produced by the electric discharge may act on the bacteria included in the water which has been stagnating in the treatment vessel (11) while the water treatment unit (10) is not operating. Therefore, the water in the treatment vessel (11) may be more reliably sterilized before the start of the normal operation.

According to the aspect embodiment of the invention, since the water flowing into the auxiliary water vessel (50) is entirely sterilized, the water which is not sufficiently sterilized may be prevented from being supplied from the water treatment unit (10) to the external facility.

DESCRIPTION OF EMBODIMENTS

Embodiments of the present invention will be described in detail with reference to the drawings. Note that the following description of embodiments is intended to provide only exemplary embodiments, and is not intended to limit scope, application, or uses of the present invention.

FIGS. 1-4 show a water treatment unit according to an embodiment. The water treatment unit (10) according to this embodiment may be used, for example, for washing vegetables.

Figure 1:
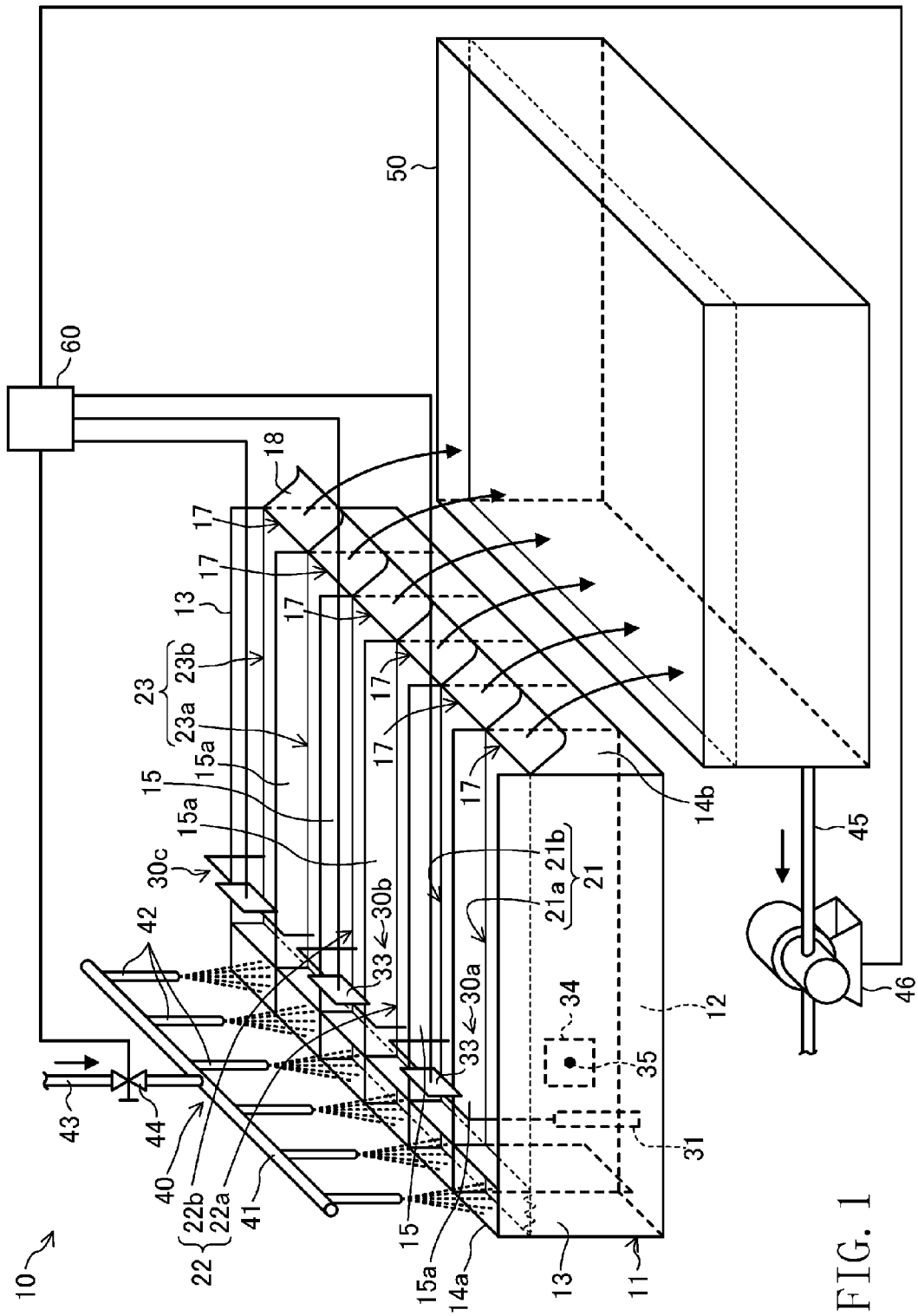
FIG. 1 schematically illustrates a perspective view of a water treatment unit according to an embodiment FIG. 2 schematically shows a sectional diagram of a water treatment unit according to an embodiment.

As shown in FIG. 1, the water treatment unit (10) includes a treatment vessel (11), a plurality of discharge units (30a-30c), a spray apparatus (40), an auxiliary water vessel (50), and a control unit (60). The spray apparatus (40) is connected to an inflow pipe (43). The auxiliary water vessel (50) is connected to an outflow pipe (45). The water treatment unit (10) allows water to flow from the inflow pipe (43) through the spray apparatus (40) into the treatment vessel (11). The water treatment unit (10) produces bactericidal water by allowing the discharge units (30a-30c) to produce bactericidal factors in the water in the treatment vessel (11), and allows the bactericidal water produced to flow through the auxiliary water vessel (50) out of the outlet pipe (45).

The treatment vessel (11) is a box-like water vessel formed in a substantially rectangular shape as viewed from above. Specifically, the treatment vessel (11) includes a bottom (12), side walls (13), and end walls (14a, 14b). The bottom (12) is a flat plate formed in a substantially rectangular shape as viewed from above. Each side wall (13) is a flat plate formed in a horizontally elongated, substantially rectangular shape. Each side wall (13) stands upward on one of both edges of the bottom (12) which oppose each other in a width direction (i.e., the two edges extending in a horizontal direction of FIG. 1). Each end wall (14a, 14b) is a flat plate formed in a horizontally elongated, substantially rectangular shape. Each end wall (14a, 14b) stands upward on one of both edges of the bottom (12) which are orthogonal to the side walls (13) (i.e., the two edges extending in a depth direction of FIG. 1). The end wall (14b) at one end of the treatment vessel (11) in a water flow direction (i.e., an outflow side) is formed to have a smaller height than the end wall (14a) at the other end of the treatment vessel (11) in the water flow direction (i.e., an inflow side) and the side walls (13), thereby providing outlets (17) above the end wall (14b) at the one end. At the top of the end wall (14b) at the one end, a slope (18) is provided to extend obliquely downward. The slope (18) allows the water flowing out of the outlets (17) to fall down.

Inside the treatment vessel (11), a plurality of dividers (15, 15a) is arranged in the width direction at predetermined intervals. Each divider (15, 15a) is a flat plate formed in a substantially rectangular shape, which is laterally long. The dividers (15, 15a) are arranged in the water flow direction to form a plurality of lanes (21a, 21b, 22a, 22b, 23a, 23b) inside the treatment vessel. Each divider (15, 15a) is made of an electrically insulating material. An opening (16) is cut in the dividers (15a) arranged in each of a first path (21), a second path (22), and a third path (23), which will be described later. In the treatment vessel (11), the dividers (15, 15a) form first to sixth lanes (21a, 21b, 22a, 22b, 23a, 23b) arranged in this order from the bottom of FIG. 1. The number of the lanes (21a, 21b, 22a, 22b, 23a, 23b) formed in the treatment vessel (11) is a mere example and may be changed as appropriate in accordance with the amount of the water flowing through the treatment vessel (11).

The pair of the first and second lanes (21a and 21b) forms the first path (21), the pair of the third and fourth lanes (22a and 22b) forms the second path (22), and the pair of the fifth and sixth lanes (23a and 23b) forms the third path (23).

Figure 2:
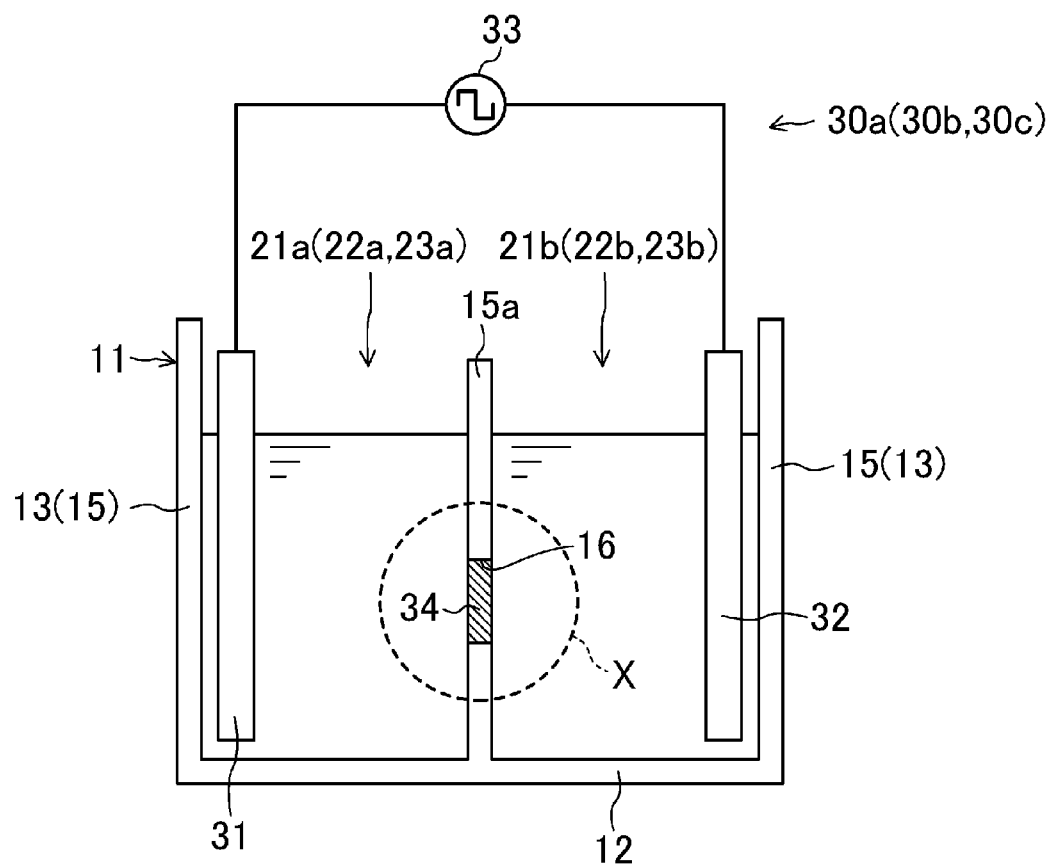

As shown in FIG. 2, the plurality of discharge units (30a-30c) is comprised of a first discharge unit (30a), a second discharge unit (30b), and a third discharge unit (30c). Each discharge unit (30a-30c) is provided for an associated one of the above-described paths (21-23).

The first discharge unit (30a) produces bactericidal factors in the water in the first path (21). The first discharge unit (30a) includes a pair of electrodes (31, 32), a high-voltage power supply (33), and the divider (15a) with the above-described opening (16). The high-voltage power supply (33) is connected to the pair of electrodes (31 and 32), and applies a predetermined voltage to the pair of electrodes (31, 32). The divider (15a) includes a discharge member (34). The pair of electrodes (31, 32), the high-voltage power supply (33) and the discharge member (34) together function as a discharge part. The second discharge unit (30b) produces bactericidal factors in the water in the second path (22). The third discharge unit (30c) produces bactericidal factors in the water in the third path (23). The specific structure of the second discharge unit (30b) and the third discharge unit (30c) is similar to that of the first discharge unit (30a), which is why the description thereof will be omitted.

The pair of electrodes (31 and 32) generates a discharge in the water. The pair of electrodes (31, 32) is comprised of a hot-side electrode (31) and a neutral-side electrode (32). The hot-side electrode (31) is a flat plate placed in the first lane (21a). The hot-side electrode (31) is connected to the high-voltage power supply (33). The neutral-side electrode (32) is a flat plate placed in the second lane (21b). The neutral-side electrode (32) is connected to the high-voltage power supply (33). The hot-side electrode (31) and the neutral-side electrode (32) are arranged substantially parallel to each other. The electrodes (31, 32) are made of, for example, a metal material highly resistant to corrosion.

Figure 3:
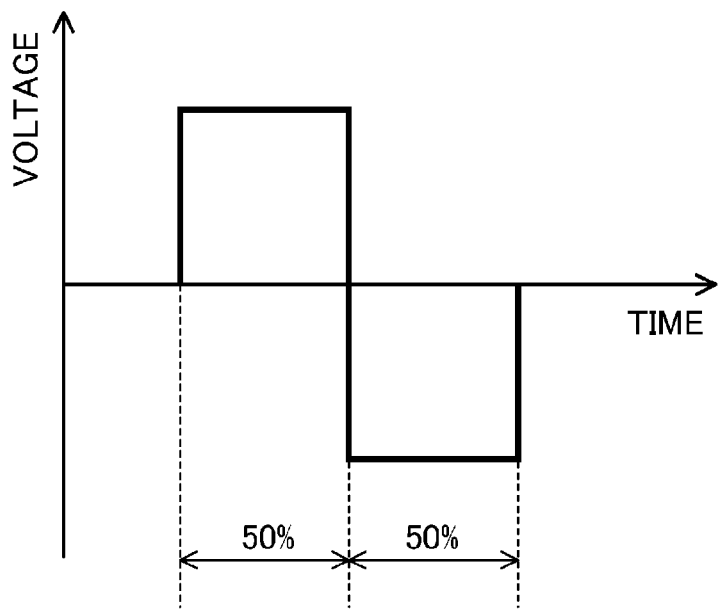
FIG. 3 illustrates the waveform of a voltage generated by a high-voltage power supply according to an embodiment.

The high-voltage power supply (33) is a power source for applying a predetermined voltage to the pair of electrodes (31, 32). In this embodiment, an example will be described where the high-voltage power supply (33) is configured to apply a voltage with an alternating waveform alternating between positive and negative values to the pair of electrodes (31, 32), as shown in FIG. 3. The duty of the alternating waveform (a square wave) is adjusted to have the same positive and negative excursions. The voltage applied to the pair of electrodes (31, 32) is a mere example. The waveform does not have to be the square wave but may be a sinusoidal wave as long as the voltage is an alternating voltage.

The discharge member (34) is a plate-like insulating member. The discharge member (34) is made of an electrically insulating material such as a ceramic material. Examples of the ceramic materials include aluminum nitride, silicon nitride, zirconia, and alumina. The discharge member (34) is arranged to close each one of the opening (16) of the divider (15a) separating the first lane (21a) and the second lane (21b), the opening (16) of the divider (15a) separating the third lane (22a) and the fourth lane (22b), and the opening (16) of the divider (15a) separating the fifth lane (23a) and the sixth lane (23b). A small discharge hole (35) is cut approximately at the middle of the discharge member (34). The discharge hole (35) is designed to have an electrical resistance of several MΩ, for example. The discharge hole (35) defines a path of current to flow between the hot-side electrode (31) and the neutral-side electrode (32). The discharge hole (35) described above serves as a density of current concentrator, which increases the density of current in the path of current to flow between the pair of electrodes (31, 32).

Figure 4:
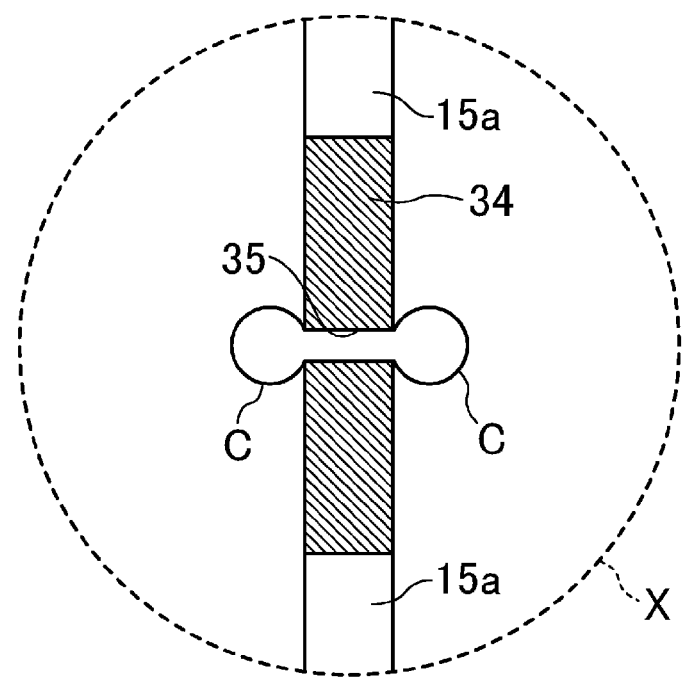
FIG. 4 is a partial enlarged view of a discharge unit according to an embodiment.

As shown in FIG. 4, when a voltage is applied to the electrodes (31, 32), the density of current in the current path increases such that Joule heat vaporizes the water in the discharge hole (35) of the discharge member (34) to produce bubbles (C). Then, the electrodes (31, 32) and the water come to have the same potential, and an interface between each bubble (C) and the water serves as an electrode to generate an electric discharge (i.e., a spark discharge). That is, in this discharge, since the two electrodes (31 and 32) do not serve as the discharge electrodes, the electrodes (31 and 32) may be less degraded by the discharge.

The spray apparatus (40) sprays the water supplied from the inflow pipe (43) to allow the water to flow into the treatment vessel (11). In the inflow pipe (43) a solenoid valve (44) switchable between an open state and a closed state is provided. The water is supplied to the spray apparatus (40) only when the solenoid valve (44) is in the open state. The spray apparatus (40) includes a nozzle header (41), and a plurality of spray nozzles (42) provided for the respective lanes (21a, 21b, 22a, 22b, 23a, 23b).

The nozzle header (41) is an elongated pipe. The nozzle header (41) is connected, at a side surface, to the inflow pipe (43), and distributes the water from the inflow pipe (43) into the spray nozzles (42).

The plurality of spray nozzles (42) is provided at predetermined intervals in a longitudinal direction of the nozzle header (41). Each of the spray nozzles (42) is provided for an associated one of the lanes (21a, 21b, 22a, 22b, 23a, 23b). The water flowing through the inflow pipe (43) flows into the nozzle header (41), and is sprayed as particles (or droplets) from the spray nozzles (42) to the associated lanes (21a, 21b, 22a, 22b, 23a, 23b). At this time, since the water sprayed from the spray nozzles (42) turns into the particles (or the droplets), air is interposed between the particles (or between the droplets) to increase the electrical resistance. This electrically insulates the water flowing through the inflow pipe (43) from the water flowing through the treatment vessel (11). The electrical resistance between the inflow pipe (43) and the treatment vessel (11) becomes hundreds of MΩ or more.

The auxiliary water vessel (50) is a water vessel provided below the outlets (17) of the treatment vessel (11). The auxiliary water vessel (50) is a box formed in a substantially rectangular shape as viewed from above, and has an open top surface. Having flowed out the outlets (17) of the treatment unit (11), the treated water flows into the auxiliary water vessel (50). The surface of the water stored in the auxiliary water vessel (50) is located at a level lower by a predetermined length than the outlets (17) or the top of the slope (18). Therefore, the water in the treatment vessel (11) becomes drops when falling down from the outlets (17) into the auxiliary water vessel (50). The water falling into the auxiliary water vessel (50) turns into the drops (i.e., the particles or the droplets), thereby interposing the air between the particles (or between the droplets) to increase the electrical resistance. This electrically insulates the water stored in the treatment vessel (11) from the water stored in the auxiliary water vessel (50). The electrical resistance between the treatment vessel (11) and the auxiliary water vessel (50) is hundreds of MΩ or more.

A side face of the auxiliary water vessel (50) is connected to the outflow pipe (45). The outflow pipe (45) includes a pump (46). When the pump (46) is activated, the water in the auxiliary water vessel (50) flows out through the outflow pipe (45) to be supplied to the external facility.

The control unit (60) controls the operation of the water treatment unit (10). The control unit (60) is either hardwired or wirelessly connected at least to the solenoid valve (44) of the inflow pipe (43), the high-voltage power supply (33) of the discharge units (30a-30c), and the pump (46) of the outflow pipe (45). The control unit (60) switches the solenoid valve (44) from the open state to the close state, or vice versa. Further, the control unit (60) activates or stops the high-voltage power supply (33). Moreover, the control unit (60) activates or stops the pump (46).

—Operation—

The operation of the water treatment unit (10) according to this embodiment will be described. In the water treatment unit (10) according to this embodiment a preparatory operation is performed to sterilize the water in the treatment vessel (11), and a normal operation is performed to produce bactericidal water in the treatment vessel (11) and to supply the bactericidal water to the external facility. The preparatory operation and the normal operation are performed by the control unit (60).

<Preparatory Operation>

While the water treatment unit (10) is not operating, water is stagnating in the treatment unit (11). Bacteria may grow in the water stagnating in the treatment unit (11). Therefore, in the water treatment unit (10) according to the present embodiment, when starting operating, the water treatment unit (10) performs the preparatory operation to sterilize the water by eliminating the bacteria grown in the treatment vessel (11).

Specifically, when the water treatment unit (10) starts operating, the solenoid valve (44) of the inflow pipe (43) is closed by the control unit (60). That is, the inflow of the water into the treatment vessel (11) and the outflow of the water from the treatment vessel (11) are stopped. The control unit (60) stops the pump (46), thereby stopping the outflow of the water from the auxiliary water vessel (50). Further, the control unit (60) activates the high-voltage power supply (33) for a predetermined period of time such that the high-voltage power supply (33) applies a square-wave voltage to the pair of electrodes (31, 32). According to this embodiment, an application of the square-wave voltage is performed by all of the discharge units (30a-30c).

When the square-wave voltage is applied to the pair of electrodes (31 and 32), the density of current in the discharge hole (35) of the discharge member (34) increases and Joule heat is generated inside the discharge hole (35). As a result, vaporization of the water progresses to produce the bubbles (C) in a vapor phase inside and near an inlet and an outlet of the discharge hole (35) of the discharge member (34). As shown in FIG. 4, each bubble (C) entirely covers an end of the discharge hole (35). In this state, the bubbles (C) function as a resistor controlling electrical conduction between the electrodes (31, 32) through the water. There is then almost no potential difference between the electrodes (31, 32) and the water, and the interface between each bubble (C) and the water serves as an electrode. This causes a dielectric breakdown inside the bubble (C) generating an electric discharge (i.e., a spark discharge).

As described above, when an electric discharge is generated in the bubble (C), bactericidal factors (e.g., active species such as hydroxyl radicals) are produced in the water in the treatment vessel (11). The thus produced bactericidal factors sterilize the water which has been stagnating in the treatment vessel (11) and in which bacteria have grown.

<Normal Operation>

In the water treatment unit (10) according to this embodiment, the normal operation is performed after the preparatory operation. During the normal operation, the control unit (60) opens the solenoid valve (44) of the inflow pipe (43). Then the water flows from the inflow pipe (43) through the spray apparatus (40) into the treatment vessel (11), and then flows out of the treatment vessel (11) through the outlets (17). That is, in the treatment vessel (11) a movement of the water from the inflow side toward the outflow side is generated. While the normal operation is being performed, the control unit (60) allows all discharge units (30a-30c) to generate an electric discharge and activates the pump (46).

Thus, during the normal operation, bactericidal factors are produced by an electrical discharge of the discharge units (30a-30c) in the water flowing through the treatment vessel (11). This produces the bactericidal water in the treatment vessel (11). The produced bactericidal water falls down from the slope (18) of the outlets (17) into the auxiliary water vessel (50). By means of the pump (46), the bactericidal water in the auxiliary water vessel (50) flows out of the outflow pipe (45) and is supplied to an external facility. The bactericidal water supplied to the external facility may be used, for example, for washing vegetables.

<Switch from Preparatory Operation to Normal Operation>

Next, it will be described how the water treatment unit (10) operates while switching from the preparatory operation to the normal operation.

While the water treatment unit (10) is not operating and while the unit (10) is performing the preparatory operation, the water does not flow from the inflow pipe (43) into the treatment vessel (11). Thus, the water stagnates inside the inflow pipe (43) and the spray apparatus (40), and bacteria may grow in the stagnating water. That is, the water stagnating in the treatment vessel (11) while the water treatment unit (10) is not operating is sterilized as a result of the preparatory operation, whereas the water stagnating inside the inflow pipe (43) and the spray apparatus (40) still has bacterial growth. Thus, unless some kind of countermeasure is implemented, during the switch from the preparatory operation to the normal operation, the water containing a large quantity of bacteria may thus flow from the inflow pipe (43) into the treatment vessel (11) and may, without having been sufficiently sterilized, flow out of the treatment vessel (11).

Therefore, in the water treatment unit (10) according to the present embodiment, the concentration of the bactericidal factors in the water in the treatment vessel (11) is sufficiently increased during the preparatory operation. That is, the preparatory operation is performed for a sufficiently long period of time such that a large amount of bactericidal factors is produced in the water in the treatment vessel (11) before the start of the normal operation.

Figure 5:
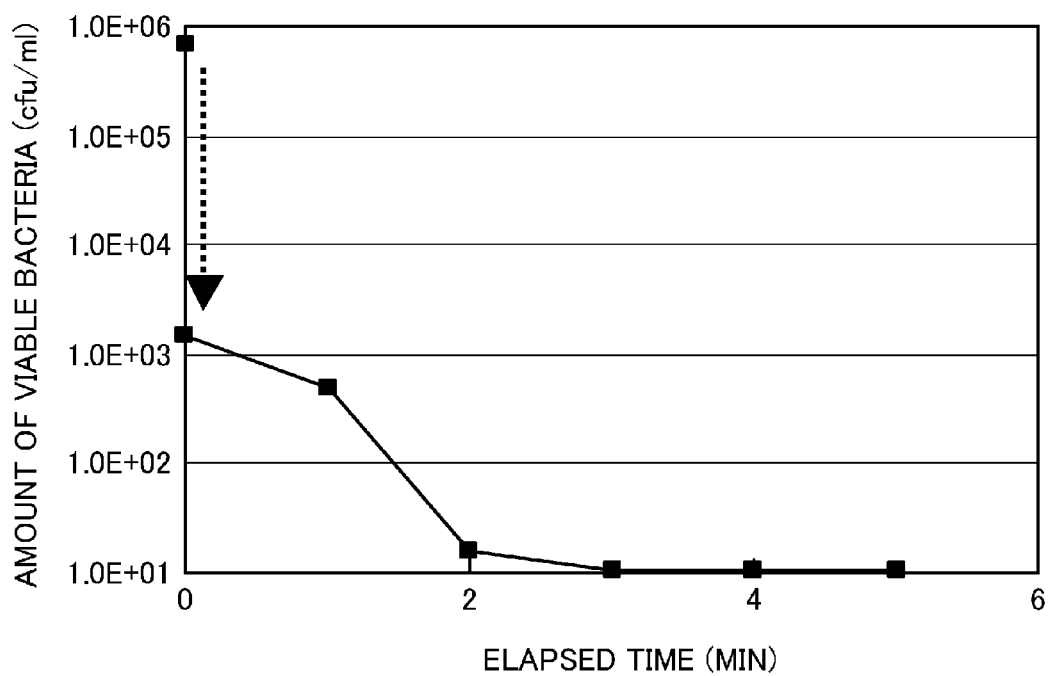
FIG. 5 is a graph showing the effect to be achieved by performing a preparatory operation for a long period of time.

FIG. 5 illustrates experimental results indirectly showing the effect of increasing the concentration of bactericidal factors in the water in the treatment vessel (11) before the start of the normal operation. In this experiment, water was stored in a predetermined vessel. In the water, an electric discharge was generated for a period of 20 minutes to produce bactericidal water with a high concentration of bactericidal factors. Then, water containing a predetermined amount of bacteria was introduced into the bactericidal water, and then a relationship between the time elapsed (represented by the abscissas) and amount of bacteria in the water (represented by the ordinates) was recorded.

According to this experiment, two minutes after the bacteria-containing water is introduced into the bactericidal water, the count of viable bacteria decreases by more than four digits, as shown in FIG. 5. The same figure also shows that the count of viable bacteria decreases by more than two digits immediately after the bacteria-containing water is introduced into the bactericidal water. Note that the duration of an electric discharge to produce bactericidal water with a high concentration of bactericidal factors does not have to be 20 minutes, and may be an arbitrary length of time.

These results of the experiment reveal that if a large amount of bactericidal factors are produced in the water in the treatment vessel (11) during the preparatory operation, the bacteria-containing water flowing into the treatment vessel (11) when the normal operation is started may be sufficiently sterilized in a short time. This may prevent the bacteria-containing water from flowing out of the treatment vessel (11) and being supplied to an external facility.

However, when focusing on the water flowing out of the treatment vessel (11) during the switch from the preparatory operation to the normal operation, concern arises that the bactericidal factors produced during the preparatory operation may fail to pervade the entire water, since the water has been stagnating in the treatment vessel (11) until shortly before the normal operation is started. If that is the case, insufficiently sterilized water may flow out of the treatment vessel (11) shortly after the normal operation has been started.

However, the water treatment unit (10) according to the present embodiment includes the auxiliary water vessel (50) to temporarily store the water flowing out of the treatment vessel (11). As described above, a movement of the water is generated in the auxiliary water vessel (50) since the water falls down from the treatment vessel (11). Thus, even if water not pervaded by the bactericidal factors flows out of the treatment vessel (11) shortly after the normal operation has been started, this water is merged, in the auxiliary water vessel (50), with the water containing bactericidal factors which subsequently flows out of the treatment vessel (11). Therefore, insufficiently sterilized water may be prevented from being supplied from the auxiliary water vessel (50) to the external facility.

—Advantages of Embodiment—

In the water treatment unit (10) according to the present embodiment, when the water treatment unit (10) starts operating, the preparatory operation is performed for a predetermined period of time. Thus, even if bacteria have grown in the water stagnated in the treatment vessel (11) while the water treatment unit (10) is not operating, the bactericidal factors produced by an electric discharge may act on the bacteria. Therefore, the water in the treatment vessel (11) may be sufficiently sterilized before the start of the normal operation.

During the preparatory operation, the bacteria-containing water does not flow into the treatment vessel (11). Thus, all of the bactericidal factors produced by an electric discharge are allowed to act on the bacteria included in the water which has been stagnating in the treatment vessel (11) while the water treatment unit (10) is not operating. Therefore, the water in the treatment vessel (11) is more reliably sterilized before the start of the normal operation.

With the auxiliary water vessel (50) provided such that the water that has flowed out of the treatment vessel (11) is to be merged in the vessel (50), the entire water is sterilized in the auxiliary water vessel (50). Therefore, insufficiently sterilized water may be prevented from being supplied out of the water treatment unit (10).

Since the waveform of the voltage generated by the high-voltage power supply (33) has the same positive and negative excursions, elution of the pair of electrodes (31, 32) may be reduced. Due to the alternating waveform of the voltage generated by the high-voltage power supply (33), deposition of metal and other substances from each electrode (31, 32) may be reduced. This results in a highly stabilized discharge.

Other Embodiments

In the above-described embodiment, while the preparatory operation is being performed, the inflow of the water into the treatment vessel (11) and the outflow of the water from the treatment vessel are stopped. However, this is only an exemplary embodiment of the present invention. For example, even while the preparatory operation is being performed, the water may still flow into the treatment vessel (11) as long as the water does not flow out of the treatment vessel (11). The reason is that as long as the water does not flow out of the treatment vessel (11), there is no risk of water containing bacteria grown while the water treatment unit (10) is not operating being supplied to the external facility.

In the above-described embodiment, the water treatment unit (10) includes the auxiliary water vessel (50). However, the present invention is not limited to this particular embodiment. The water treatment unit (10) does not have to include the auxiliary water vessel (50). The bactericidal water produced in the treatment vessel (11) may be directly supplied from the treatment vessel (11) to the external facility.

INDUSTRIAL APPLICABILITY

As can be seen from the foregoing description, the present invention is useful for a water treatment unit.

DESCRIPTION OF REFERENCE CHARACTERS

10 Water Treatment Unit
11 Treatment Vessel
31 Electrode (Discharge Part)
32 Electrode (Discharge Part)
33 High-Voltage Power supply (Discharge Part)
34 Discharge Member (Discharge Part)
50 Auxiliary Water Vessel

The invention claimed is:

1. A water treatment unit comprising:
a treatment vessel configured to store water;
a discharge unit configured to generate an electric discharge to produce bactericidal factors in the water in the treatment vessel, the discharge unit including a pair of electrodes and a high-voltage power supply;
an inflow nine valve; and
a control unit configured to
during a preparatory operation, control the inflow pine valve to a closed state to suspend inflow of water into the treatment vessel and outflow of water from the treatment vessel, and activate the high-voltage power supply; and
during a normal operation, control the inflow pipe valve to an open state to allow water to flow into, and flow out of, the treatment vessel, and activate the high-voltage power supply to generate an electric discharge in a state where the water flows into the treatment vessel and treated water flows out of the treatment vessel
wherein the control unit is configured to perform the preparatory operation for a predetermined period of time before starting the normal operation.

2. The water treatment unit of claim 1, further comprising:
an auxiliary water vessel into which the treated water flows from the treatment vessel, and
wherein the water treatment unit supplies the water from the auxiliary water vessel to an external facility.

3. A method for operating a water treatment unit, the water treatment unit including:
a treatment vessel configured to store water;
a discharge unit configured to generate an electric discharge to produce bactericidal factors in the water in the treatment vessel, the discharge unit including a pair of electrodes and a high-voltage power supply; and
an inflow pipe valve,
the method comprising:
if an operation in which the inflow pipe valve is controlled to an open state to allow water to flow into, and flow out of, the treatment vessel, and activate the high-voltage power supply to generate an electric discharge in a state where the water flows into the treatment vessel and treated water flows out of the treatment vessel is a normal operation, and
an operation in which the inflow pipe valve is controlled to a closed state to suspend inflow of water into the treatment vessel and outflow of water from the treatment vessel, and activate the high-voltage power supply is a preparatory operation,
performing the preparatory operation for a predetermined period of time before starting the normal operation.

* * * * *